Aug. 15, 1967
V. C. REDDY
3,335,710
DIESEL ENGINE FLAME PRIMER
Filed March 9, 1965
2 Sheets-Sheet 1
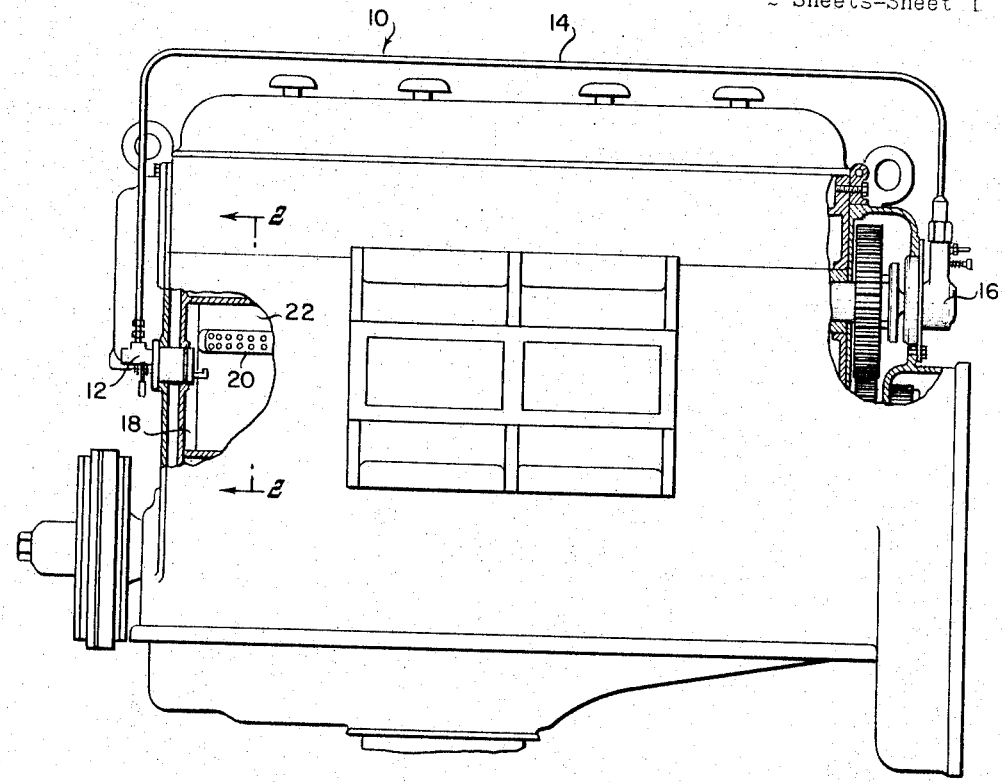
fig.1
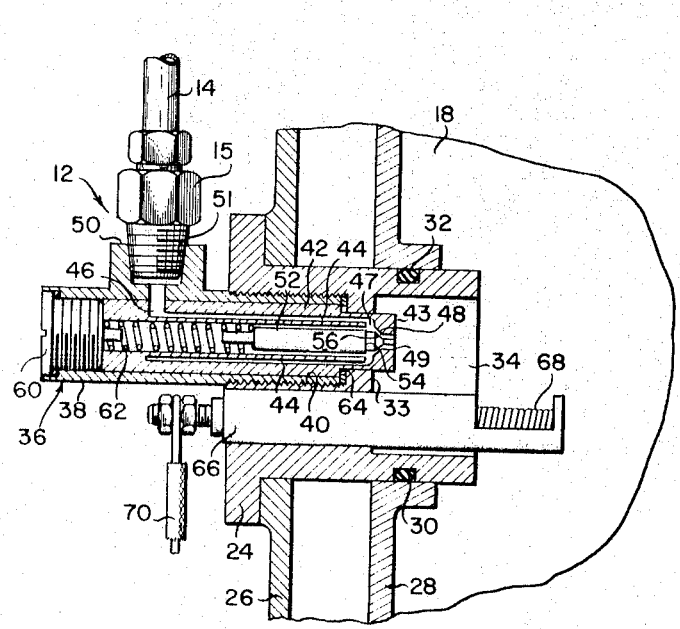
fig.3
fig.2
INVENTOR.
Virgin C. Reddy
BY
C. L. Engle
ATTORNEY

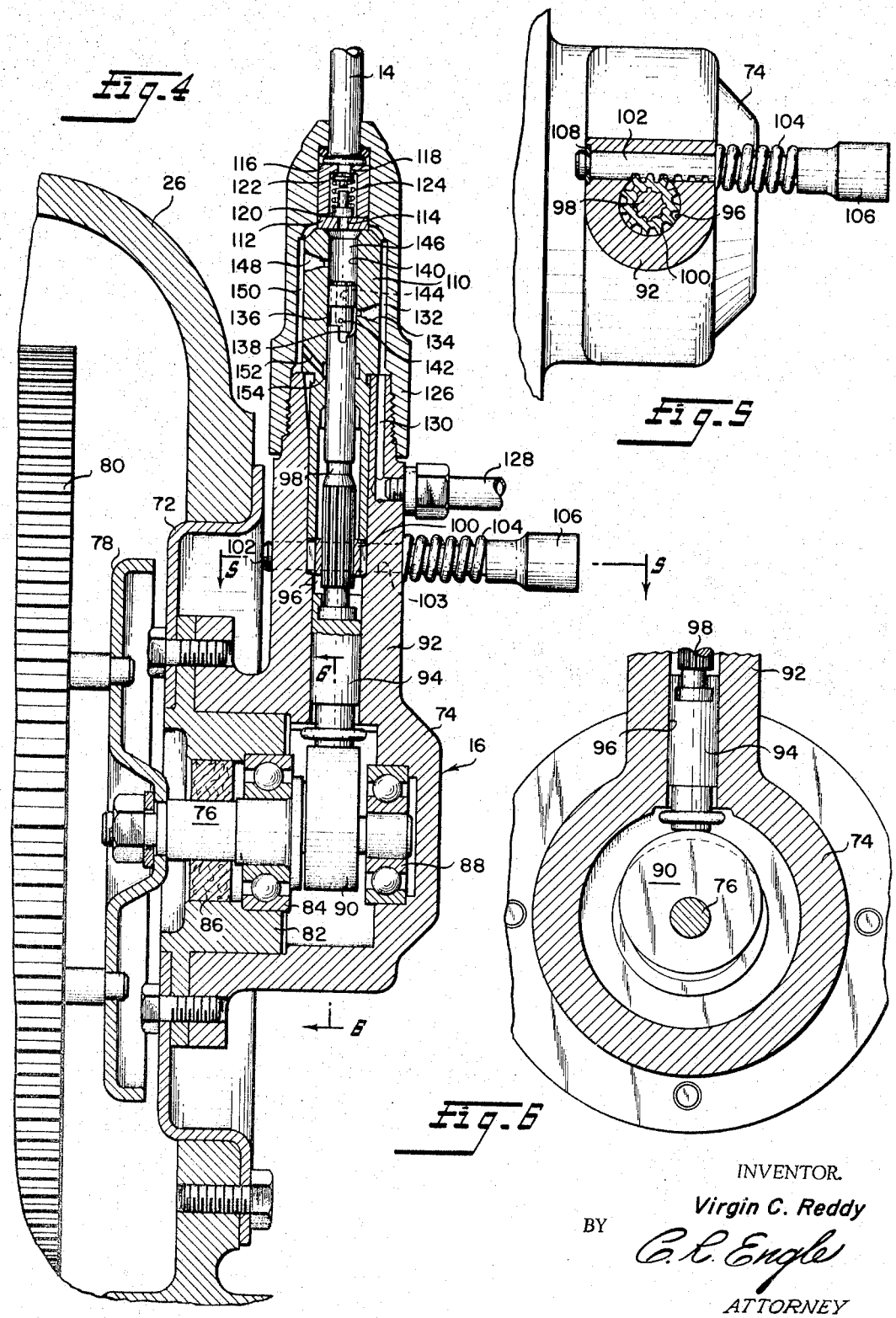

United States Patent Office 3,335,710
Patented Aug. 15, 1967

3,335,710
DIESEL ENGINE FLAME PRIMER
Virgin C. Reddy, Livonia, Mich., assignor to General Motors Corporation, Detroit, Mich., a corporation of Delaware
Filed Mar. 9, 1965, Ser. No. 438,211
1 Claim. (Cl. 123—122)

ABSTRACT OF THE DISCLOSURE

In preferred form, this disclosure concerns a cold starting system for an internal combustion engine of the compression ignition type. A reciprocating plunger type pump is driven by a component of the engine so that it supplies fuel in accordance with engine cranking speed to a nozzle assembly mounted in the air inlet manifold of the engine. The timing of the fuel pulses in conjunction with the regulation of the quantity of fuel assures a combustible mixture adjacent an igniter member also disposed in the air inlet manifold whereby the fuel is ignited and the air heated prior to entrance to the engine cylinders.

---

This invention relates generally to starting devices for internal combustion engines and more specifically to a flame primer for an internal combustion engine of the compression ignition type.

It is well known in the internal combustion engine art to utilize flame primers to heat the intake air in the air box of a compression ignition internal combustion engine to facilitate cold starts. In the past, fuel has been delivered to the fuel nozzles of the flame primers either by a manually operated pump or an electrically driven one. Both methods for delivering the fuel have disadvantages. In the former, it is difficult to gauge the correct number of fuel injectors necessary particularly since engine speed increases during starting. In the latter, a constant flow is provided and tends to deliver an over-abundant supply of fuel with the result that the intake air may be left with insufficient oxygen to support the regular combustion in the engine cylinders.

Accordingly, it is an object of this present invention to provide a flame primer system wherein the amount of fuel delivered to the flame primer nozzles is consistent with the demands of the engine.

A further object of the present invention is to provide a flame primer system wherein the fuel is delivered intermittently to the primer nozzles.

A still further object is to provide a flame primer system wherein the quantity of the intermittent fuel delivered remains constant.

Yet another object of the present invention is to provide a flame primer system wherein the quantity of the constant intermittent fuel delivered to the fuel nozzles may be selectively predetermined.

These and other objects will become more apparent from the following description of the preferred embodiment of the present invention in conjunction with the accompanying drawings wherein like character references designate like parts throughout the several views:

FIGURE 1 is a side elevational view partially in cross section of an internal combustion engine incorporating the present invention.

FIGURE 2 is a side elevational view of a portion of the internal combustion engine taken along the lines 2—2 of FIGURE 1 looking in the direction of the arrows.

FIGURE 3 is a side elevational view taken along the lines 3—3 of FIGURE 2 and looking in the direction of the arrows.

FIGURE 4 is an enlarged cross sectional view of the upper right hand portion of FIGURE 1.

FIGURE 5 is a plan view, partially in cross section taken along the lines 5—5 of FIGURE 4 and looking in the direction of the arrows.

FIGURE 6 is a side elevational view taken along the lines 6—6 of FIGURE 4 and looking in the direction of the arrows.

Referring now to the drawings and particularly to FIGURE 1, an internal combustion engine 10 is provided with a flame primer system comprising a flame primer nozzle assembly 12, a fuel delivery conduit 14 and an engine driven pump 16. The flame primer nozzle assembly 12 is mounted in the water jacket walls of engine 10 and extends into an air box 18 which communicates with an air intake (not shown). As best seen in FIGURE 2, the flame primer nozzle assembly is adjacent the air inlets 20 in the cylinder walls 22. The structure of the flame primer nozzle assembly 12 is shown in greater detail in FIGURE 3. The nozzle assembly 12 comprises a flanged plug member 24 mounted in aligned apertures in the outer and inner water jacket walls 26 and 28, respectively, of engine 10. A resilient O-ring 30 disposed within circumferential groove 32 of plug member 24 provides a seal between the plug member and the inner wall 28. Plug member 24 comprises an apertured inwardly extending radial wall 33 which partially defines a cupped cavity 34.

The flame primer nozzle assembly 12 includes a fuel nozzle 36 comprising a tubular housing 38 which is threadably secured within bore 40 in plug member 24. The housing 38 carries boss 50 with an internally threaded bore 51 in which is secured connection 15 on conduit 14. Disposed within housing 38 is a sleeve 42, the end of which extends beyond the housing 38 and into cavity 34. The sleeve 42 has a plurality of axial passages 44 which extend from a radial passage 46, aligned with bore 51, to an annular chamber 47. A portion 48 of the chamber walls is tapered and contiguous with an orifice 49 in the end wall 43 of sleeve 42. The tapered wall 48 provides a valve seat. Disposed within the sleeve 42 is a valve 52 having a shoulder 54 exposed to chamber 47. The forward portion of valve 52 is tapered at 56 to mate with the tapered valve seat 48.

The outer end of the tubular housing 38 is closed with a threaded cap 60 which provides an abutment for spring 62 disposed within sleeve 42 to bias valve 52 into a closed position. The cap 60 also serves to retain sleeve 42 between it and circumferential shoulder 64 at the forward end of housing 36. Mounted in the lower portion of plug member 24 is an igniter 66. The igniter 66 which extends into recess 34 has an exposed coil 68 on its inner end. A conductor 70 connects coil 68 with a source of electrical energy (not shown).

Referring now to FIGURE 4, a more detailed description of pump 16 will be given. Mounted in the engine outer wall 26 is an annular plate 72 to which is bolted a pump housing 74. A shaft 76, bolted to a disc 78 which is attached to a gear 80, extends through annular plate 72 and into the pump housing 74. A hub 82 is sandwiched between the plate 72 and the pump housing 74 and carries an inner shaft bearing 84 and an annular bearing seal 86. The outer end of shaft 76 is journaled in a second bearing 88 mounted in a recess in the lower portion of pump housing 74. Shaft 76 carries a cam 90 between the bearings 84 and 88.

The upper portion of the pump housing 74 comprises a vertical tubular section 92. A cam follower 94, having a plunger 98 attached thereto, reciprocates within bore 96 of the tubular section and engages cam 90 at its lower end. The middle portion of plunger 98 is splined and mounts a gear 100 which in turn engages a rack 102 reciprocably mounted in transverse bore 103 in pump housing 74. A coil spring 104 is disposed between the pump housing 74 and an enlarged handle 106 on rack 102 to bias the rack to the right as viewed in FIGURE 4. A stop washer 108 is provided in an annular groove in rack 102 to prevent withdrawal of the rack from the pump housing.

The upper end of plunger 98 is disposed within sleeve 110 which is supported on the top edge of the tubular pump housing section 92. A disc 112 having an orifice 114 rests atop the sleeve 110 and supports a cuplike member 116 having an orifice 118 in its upper surface. Check valves 120 and 122 are biased in a closed position by spring 124 to normally close orifices 114 and 118, respectively. The fuel delivery conduit 14 communicates with orifice 118. A cap 126 threaded to the tubular pump housing section 92 encloses and secures the valves in their operative positions.

A fuel supply conduit 128 is connected to pump housing 74 so as to connect with a passage 130 therein. The passage 130 connects with an inlet chamber 132 between sleeve 110 and cap 126. Sleeve 110 is provided with a radial inlet passage 134 which leads from inlet chamber 132 to a chamber 136 defined by a helical circumferential groove 138 in the upper end of plunger 98 and bore 140 of sleeve 110. A transverse bore 142 and an axial bore 144 establishes fluid communication between chamber 136 and bore 140 above plunger 98 which forms a cylinder 146. A port 148 leads from cylinder 146 to a passage 150 which connects with an inclined passage 152 and annular chamber 154 leading to an exhaust opening (not shown).

Operation

The operation of the subject invention will now be described. The handle 106 is moved toward the left in FIGURE 4 against the force of spring 104 to position rack 102 at a desired setting. The rack 102 is maintained in its adjusted position by suitable retaining means (not shown). Movement of handle 106 and rack 102 rotates plunger 98 which changes the relationship between the helical circumferential chamber 136 and passage 134. This relationship determines the effective stroke of plunger 98 and the amount of fuel to be delivered thereby per stroke and is a concept of the prior art as shown in Fielden 1,981,913. Fuel from conduit 128 fills inlet chamber 132, inlet passage 134, chamber 136, bores 142 and 144 and cylinder 146. The amount of fuel in cylinder 146 has been determined by the adjustment of rack 102. As cam 90 rotates through it first 180° to the position shown in FIGURE 4, plunger 98 moves upwardly in cylinder 146 forcing the fuel therein past check valve 120 and into conduit 14. Any excess fuel goes out port 148, through passages 150 and 152 and into chamber 154 from whence it is exhausted. As the cam continues to rotate through the second 180°, more fuel is drawn into cylinder 146 from bore 144 with return of fuel from conduit 14 being prevented by check valve 120. Since cam 90 is driven directly from the engine crankshaft (not shown), pump 16 will deliver to conduit 14 pulses of pressurized fuel in timed relationship to and in proportion to the speed of engine.

Referring momentarily to FIGURE 1, it is seen that pump 16 delivers pulses of pressurized fuel to flame primer nozzle assembly 12 via conduit 14. Referring now to FIGURE 3, when a pulse of pressurized fuel is delivered to injector 36, this pulse will travel through bore 51, radial passage 46, passage 44 and into chamber 47. When the pulse has reached chamber 47, it will act on shoulder 54 opening valve 52 against the action of spring 62 and a fine spray of fuel will discharge from orifice 49 into air box 18. The opening of valve 52 causes the pressure in the pulse to dissipate and the valve 52 is closed by spring 62. The fuel spray which has flowed through orifice 49 contacts coil 68 and is ignited thereby. These periodic ignitions warm the air in air box 18 which is being delivered to the cylinders 22 via openings 20. Thus, this invention provides a flame primer system wherein the fuel is delivered intermittently to the primer nozzles in timed relationship to and consistent with the demands of the engine. The invention also provides a flame primer system in which the quantity of the intermittent fuel deliveries can be selectively varied.

It should be understood, of course, that the foregoing disclosure relates to only a preferred embodiment of the invention and that numerous modifications may be made therein without departing from the spirit and scope of the invention as set forth in the appended claim.

What is claimed is:

A flame primer system for an interal combustion engine having an air inlet manifold and being of the compression ignition type comprising an engine driven pump to supply an auxiliary quantity of fuel in relation to engine cranking speed, a plug support member mounted in said air inlet manifold, a nozzle mounted in said support member to discharge auxiliary fuel into said air inlet manifold, said nozzle comprising a housing member secured to said plug support member, a sleeve member disposed within said housing member and extending beyond said housing into said air inlet manifold, a spring biased valve reciprocably mounted in said sleeve member, said valve comprising a tapered portion to mate with a like surface on said sleeve member and having a circumferential shoulder circumscribing said tapered surface, said sleeve member having a longitudinal annular fuel passage connecting with an annular chamber therein, said annular chamber containing said valve tapered portion and supplying fuel under pressure against said valve shoulder to effect momentary opening of said valve as fuel is transmitted from said pump, and an igniter mounted in said plug support member to ignite said auxiliary fuel and warm the inlet air so that the engine may initiate continuous compression ignition.

References Cited

UNITED STATES PATENTS

| | | | |
|---|---|---|---|
| 2,044,113 | 6/1936 | Woolson | 123—179 |
| 2,229,714 | 1/1941 | Wirrer | 123—122 X |
| 3,020,903 | 2/1962 | Kloss | 123—179 X |
| 3,024,777 | 3/1962 | Baker | 123—122 |

FOREIGN PATENTS 490,308    8/1930    Germany.

MARK NEWMAN, *Primary Examiner.*

AL L. SMITH, *Examiner.*